US 9,135,160 B1

(12) United States Patent
Zheng et al.

(10) Patent No.: US 9,135,160 B1
(45) Date of Patent: Sep. 15, 2015

(54) DEVICES, SYSTEMS, AND METHODS FOR WEAR LEVELING MEMORY

(75) Inventors: Hongzhong Zheng, Sunnyvale, CA (US); Joseph James Tringali, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 611 days.

(21) Appl. No.: 13/429,360

(22) Filed: Mar. 24, 2012

Related U.S. Application Data

(60) Provisional application No. 61/468,263, filed on Mar. 28, 2011.

(51) Int. Cl.
G06F 12/02 (2006.01)
G06F 3/06 (2006.01)

(52) U.S. Cl.
CPC .......... *G06F 12/0246* (2013.01); *G06F 3/0616* (2013.01); *G06F 2212/1032* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 2007/0103992 A1* | 5/2007 | Sakui et al. | 365/185.33 |
| 2010/0174851 A1 | 7/2010 | Leibowitz et al. | |
| 2010/0185805 A1 | 7/2010 | Chen et al. | |
| 2010/0262795 A1 | 10/2010 | Hetzler et al. | |

OTHER PUBLICATIONS

Jung et al., "A Group-Based Wear-Leveling Algorithm for Large-Capacity Flash Memory Storage Systems," Cases '07, Sep. 30-Oct. 3, 2007, Salzburg, Austria. 5 pages.
Seong et al., "Security Refresh: Prevent Malicious Wear-Out and Increase Durability for Phase-Change Memory with Dynamically Randomized Address Mapping," ISCA '10, Jun. 19-23, 2010, Saint-Malo, France. 12 pages.

* cited by examiner

*Primary Examiner* — Midys Rojas
(74) *Attorney, Agent, or Firm* — Stolowitz Ford Cowger LLP

(57) ABSTRACT

Systems, devices, and methods are disclosed for leveling wear on memory. Such systems, methods, and devices include the memory, one or more wear leveling engines and one or more wear leveling policies, a were leveling mechanism comprising one of the wear leveling engines and one of the wear leveling policies. Further embodiments may include a decision engine having a write traffic signature mechanism wherein the decision engine selects a wear leveling engine and wear leveling policy based upon receiving a write traffic signature of the memory from the write traffic signature mechanism and receiving status data from the memory.

45 Claims, 10 Drawing Sheets

501

DEVICES, SYSTEMS, AND METHODS FOR WEAR LEVELING MEMORY

CROSS REFERENCE TO RELATED APPLICATIONS

This application claims the benefit of priority under 35 U.S.C. §119(e) from U.S. Provisional Patent Application No. 61/468,263, entitled "Devices, Systems, and Methods for Wear Leveling Memory," filed on Mar. 28, 2011, incorporated herein by reference.

FIELD

The present disclosure generally describes embodiments relating to devices, systems, and methods that prolong the lifetime of memory. Particularly, the present disclosure describes embodiments relating to devices, systems, and methods that implement wear leveling on memory.

BACKGROUND

Memory devices used in different computing devices (e.g. computers, smartphones, etc.) include short-latency storage devices (e.g. random access memory (RAM)) and long-latency storage devices (e.g. hard disk drive). The latency relates to the cycle time of a processor accessing the memory device. Short-latency storage devices can be used to store frequently used software applications or computer programs such as operating system functions. Further, short-latency storage devices are made up of memory blocks or pages implemented by an electronic or semiconductor device. The lifetime of the electronic or semiconductor device (and its associated memory block) is limited by the number of writes (e.g. storing actions) subjected to it. Thus, if an operating system task, particular software application, or specific computer program is used more frequently than other such computer functions, then the respective associated memory block is subjected to a significant number of more write operations than other memory blocks associated with other, less frequently used computer functions within the short-latency storage device. If the number of write operations subjected to a particular memory block exceeds a threshold or tolerance, then the memory block is deemed corrupted and incapable of functioning. Further, if one memory block becomes corrupted, then the entire memory device is considered corrupted and defunct by the operating system or CPU.

Different wear leveling techniques implemented by using various devices, systems, and methods spread write operations for the frequently used software application across the different memory blocks, thereby prolonging the lifetime of the memory device. Some wear leveling techniques are implemented by static or fixed mechanisms designed for worst case scenarios for a memory with a write tolerance on the order of $10^8$ writes. Implementing fixed mechanisms designed for memory having tolerances of only $10^8$ writes encumbers performance and creates an energy penalty.

DETAILED DESCRIPTION

The present disclosure describes devices, systems, and methods that implement different wear leveling techniques, including adaptive wear leveling mechanisms. In some embodiments, these wear leveling techniques can prolong the lifetime of a memory device (i.e. memory) and also effectively wear level memory based on performance and/or energy targets thereby reducing any performance or energy penalty for implementing wear leveling. The embodiments disclosed include a memory, one or more wear leveling engines and one or more wear leveling policies as well as a decision engine having a write traffic signature mechanism. In some embodiments, a write traffic signature is a set of statistics for evaluating effectiveness of wear leveling mechanisms that are functions of writes to the memory including number of writes, write distribution, max writes to a region. Further, the decision engine selects a wear leveling mechanism based upon receiving a write traffic signature of the memory from the write traffic signature mechanism and receiving status data from the memory. In addition, in an embodiment, a wear leveling mechanism is a combination of a wear leveling engine from the one or more wear leveling engines and a wear leveling policy from the one or more wear leveling policies.

Figure 1:
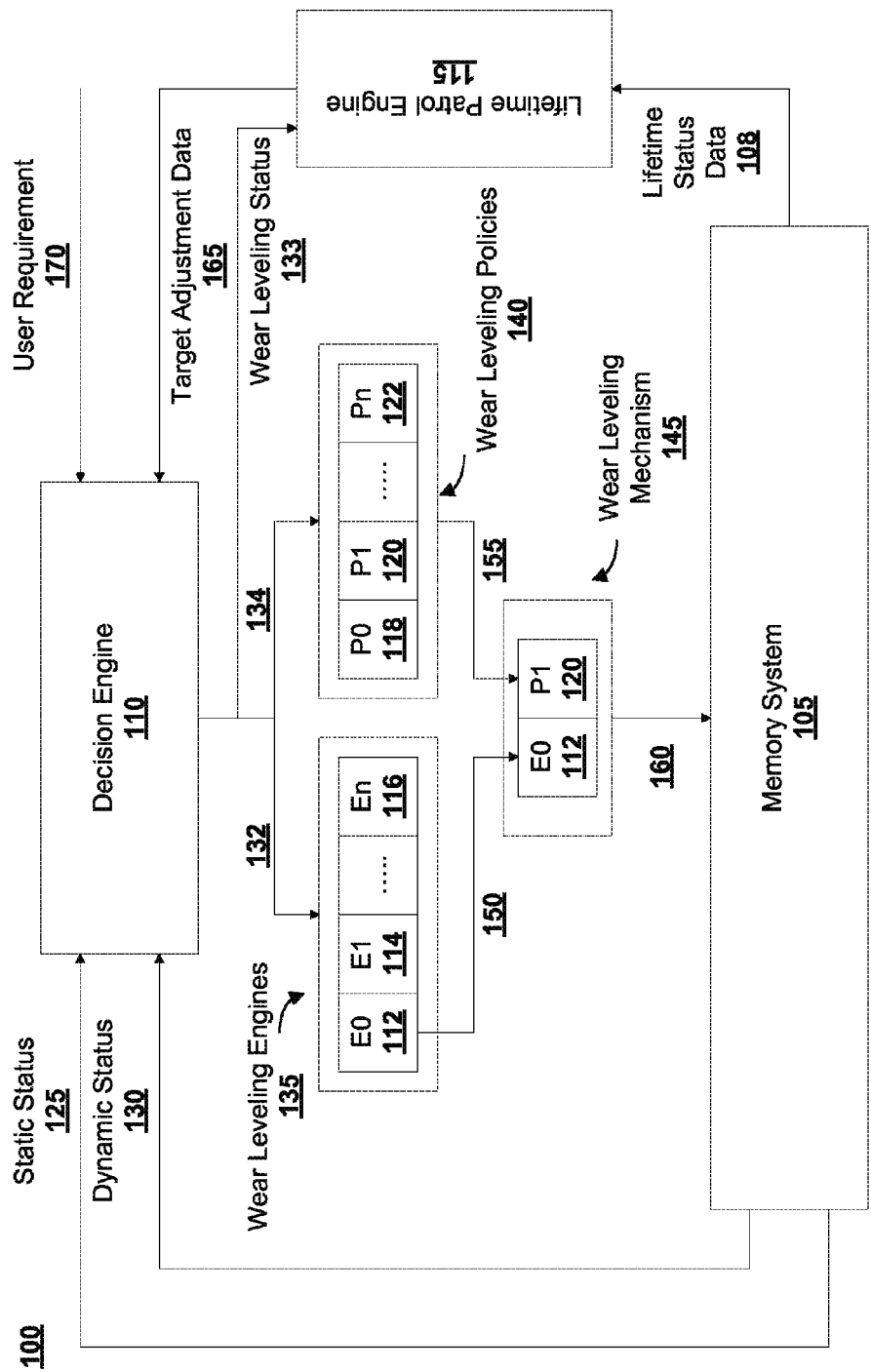
FIG. 1 is an exemplary functional block diagram of a wear leveling system.

FIG. 1 is an exemplary functional block diagram of a wear leveling system 100. Such a wear leveling system 100 includes a memory system 105, a decision engine 110, multiple wear leveling engines (135, 112-116), multiple wear leveling policies (140, 118-122), and a wear leveling mechanism 145. In a preferred embodiment, the memory system 105 can be memory with limited write endurance, such as RAM, RRAM, MRAM, PCM, flash, or other storage media. The decision engine 110 is coupled (132, 134 respectively) to the multiple wear leveling engines (135, 112-116) and multiple wear leveling policies (140, 118-122). Further, the decision engine 110 determines the wear leveling mechanism 145 by selecting one of the multiple wear leveling engines (135, 114) and one of the multiple wear leveling policies (140, 120). In addition, the wear leveling mechanism 145 is coupled 160 to the memory system 105. A lifetime patrol engine 115 is coupled to the memory system 105 and receives memory lifetime status data 108 from the memory system 105. In one embodiment, the lifetime patrol engine receives wear leveling status 133 from the decision engine 110 and transmits target adjustment data 165 to the decision engine 110.

Decision Engine 110

The decision engine 110 receives status data pertaining to the status of the memory system 105 directly (as shown in FIG. 1) or indirectly from memory system 105. (collectively called status data) Status data can include static status data 125, such as data relating to memory endurance, memory capacity, and memory organization, for example. In addition, or in the alternative, status data can include dynamic status data 130, such as data relating to application behavior and its effect on the memory system 105 such as write bandwidth, footprint, and distribution, for example.

The decision engine 110 also receives target adjustment data 165 from the lifetime patrol engine 115. The target adjustment data 165 is generated by the lifetime patrol engine 115 based on lifetime status data 108 received from the memory system 105 and wear leveling status 133 received from the decision engine 110. Target adjustment data 165 may include adjusted memory lifetime target data, adjusted performance target data, or adjusted energy target data.

Further, in one embodiment, the decision engine 110 receives user requirement data 170 from a user interface (not shown). User requirement data 170 includes lifetime target data, performance target data or energy target. For example, user requirements may be a 15 year lifetime target, 1000 transactions completed per second performance target, or a 100 pJ per transaction energy target.

Based on its various inputs (static status 125, dynamic status 130, target adjustment data 165, and user requirements 170), the decision engine 110 determines a wear leveling engine (e.g., wear leveling engine 112) and a wear leveling policy (e.g., policy 120) to be applied over one or more wear leveling epochs or time periods.

The exemplary wear leveling system 100 shown in FIG. 1 is described as a closed loop control system for leveling wear on the memory system 105 by adaptively selecting different wear leveling mechanisms over different time periods or epochs based on feedback data such as static status data 125, dynamic status data 130 from the memory system 105, target adjustment data 165 from the lifetime patrol engine 115, and user requirements data 170 (or, in some embodiments, some subset thereof). In an embodiment, the decision engine determines the wear leveling mechanism 145 by selecting a wear leveling engine 114 from the multiple wear leveling engines 135 and selecting a wear leveling policy 120 from the multiple wear leveling policies 140. Thus, a wear leveling mechanism is a wear leveling engine—wear leveling policy pair. The selection of the wear leveling engine, policy pair is for a next wear leveling epoch based on the feedback data (e.g. static status 125, dynamic status 130, target adjustment data 165, and user requirements 170) and a current wear leveling engine policy pair. The decision engine 110 can be implemented in software by an operating system of a device that includes the memory system 105, or alternatively, the decision engine 110 can be implemented by a memory controller of the memory system 105. In an embodiment, each of the multiple wear leveling engines 135 is implemented by hardware functional units that perform the wear leveling operations such as data migration and/or memory address translation. In an embodiment, each of the multiple wear leveling policies 140 is implemented by configuring software that controls the wear leveling engines. Wear leveling policies may have policy control parameters include for example but are not limited to wear leveling frequency, granularity, and region size.

Referring again to FIG. 1, in an embodiment, the wear leveling system 100 offers a second level of feedback by the lifetime patrol engine 115, which receives lifetime status data 108 from the memory system 105. The lifetime status data 108 can include indicia of memory system status an indication of a number of writes of different portions of the memory system 105. The lifetime patrol engine 115 also receives wear leveling status data 133 from the decision engine 110 that includes data regarding the effect of wear leveling in prolonging the lifetime of the memory system 105. In some embodiments, wear leveling status data 133 includes lifetime estimate, performance overhead estimate and/or energy overhead estimate calculated by a lifetime approximation engine and an overhead grading engine of the decision engine. Such data (133 and 108) assists the lifetime patrol engine 115 in monitoring the lifetime of the memory system 105 and adjusting performance and energy targets for the memory system 105. For example, a lifetime target can be 15 years. Lifetime patrol engine calculated that the current lifetime target is 20 years by implementing the wear leveling mechanism during the previous epochs. The lifetime patrol engine can adjust lifetime target of the following epochs to target 10 years and provide such data in feedback to decision engine to still meet the user required 15 year lifetime target. Thus, in some embodiments, the decision engine 110 receives the target adjustment data 165 and bases selection of a wear leveling mechanism 145 for a next wear leveling epoch or time period based on the target adjustment data 165 in addition to the static status 125 and dynamic status 130 received from the memory system 105 to achieve memory lifetime (e.g. usable lifetime of memory), performance, and energy targets. In some embodiments, the lifetime patrol engine may not be implemented in the wear leveling system 100.

For example, a current configuration of wear leveling mechanism (wear leveling engine—wear leveling policy pair) is selected such that the wear leveling mechanism would achieve a memory lifetime target of e.g., 15 years. However, due to application behavior and other computer actions subjected to the memory, the current configuration of the wear leveling mechanism is currently estimated to provide a memory lifetime of 1.5 years. Thus, an adjusted memory lifetime target of 30 years, for example, is determined such that the memory achieves the original 15 year lifetime target. Accordingly, a different configuration of a wear leveling mechanism (wear leveling engine-wear leveling policy pair) is selected to achieve the adjusted target (e.g. 30 years).

Figure 2A:
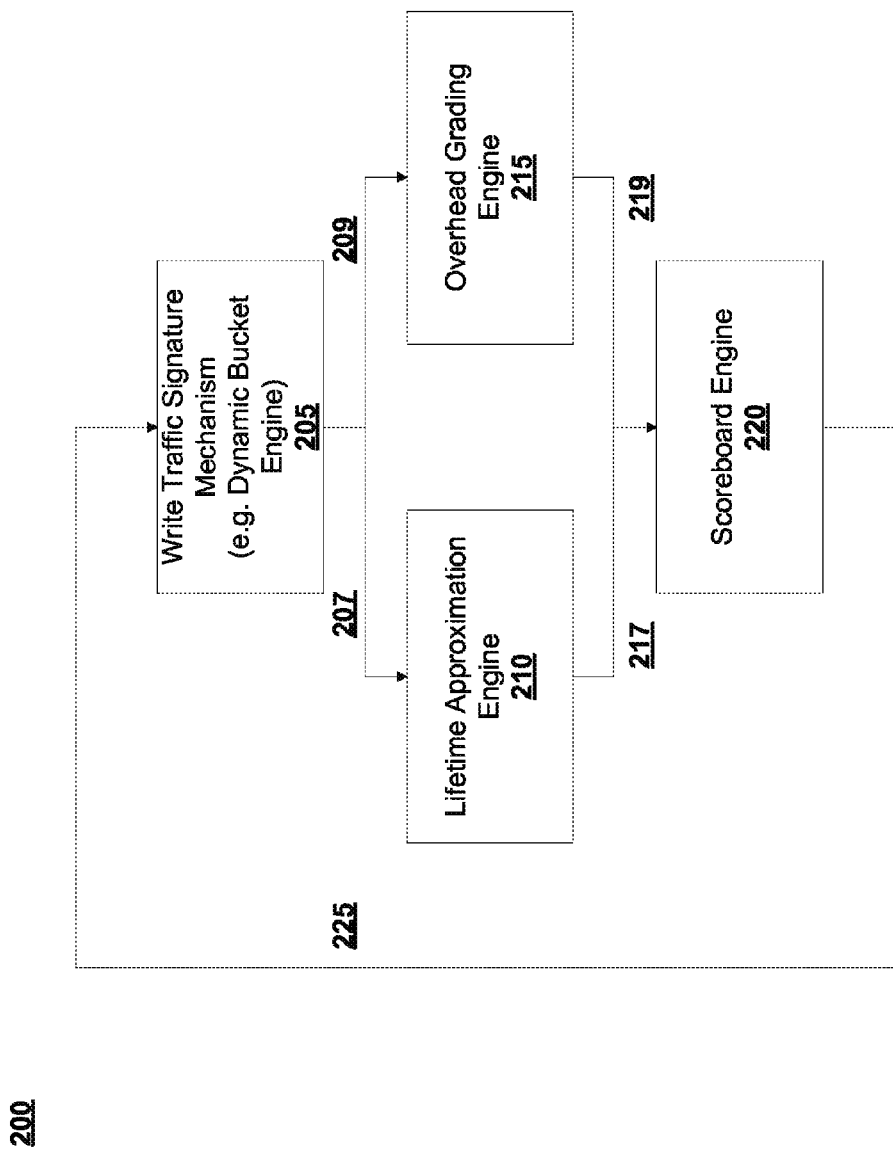
FIG. 2A is an exemplary functional block diagram of a decision engine in an exemplary wear leveling system.

FIG. 2A is an exemplary functional block diagram of an exemplary decision engine 200 in an exemplary wear leveling system. The exemplary decision engine 200 includes a write traffic signature mechanism (such as a dynamic bucket engine) 205, a lifetime approximation engine 210, an overhead grading engine 215, and a scoreboard engine 220. The scoreboard engine 220 is coupled 225 to the write traffic signature mechanism 205. Further, the write traffic signature mechanism 205 is coupled (207 and 209 respectively) to the lifetime approximation engine 210 and the overhead grading engine 215. In addition, the lifetime approximation engine 210 is coupled 217 to the scoreboard engine 220 and the overhead grading engine 215 is also coupled 219 to the scoreboard engine 220.

The exemplary decision engine 200 implements quality-of-service control such that the decision engine 200 selects an appropriate wear leveling mechanism according to recent system status data to meet system/user requirements over one or more wear leveling epochs or time periods. An adaptive wear leveling system incorporating the decision engine 200 can be described as an event driven, closed loop feedback system. Thus, the decision engine 200 selects a different wear leveling mechanism at every wear leveling epoch. The write traffic signature mechanism 205 produces a write traffic signature of a memory system that, for example, shows a number of writes subjected to different memory blocks of the memory system. Further, the lifetime approximation engine 210 estimates memory lifetime based upon a recent write traffic signature. In addition, the overhead grading engine 215 estimates performance and energy overhead encumbrances in selecting different wear leveling engine and wear leveling policy candidates.

The scoreboard engine 220 decides actions for next epochs such as switching a wear leveling policy and/or switching wear leveling engines based on frequency, region, granularity or wear leveling engines. In an embodiment, each component of the decision engine such as the write traffic signature mechanism 205, the lifetime approximation engine 210, the overhead grading engine 215, and the scoreboard engine 220 analyzes and provides data to each other to allow the decision engine to select an appropriate wear leveling mechanism. This selection can be based on recent system status to meet system/user requirements such as lifetime, performance, and/or energy targets.

As mentioned in the present disclosure, the lifetime approximation engine 210 estimates memory lifetime based upon recent write traffic signature. Further, system lifetime is limited by lifetime of a region of memory receiving maximum write traffic. The lifetime approximation engine 210 estimates memory lifetime using one or more different methods or techniques. One such method is estimating memory lifetime based on write traffic signature using the following equation:

$$\text{Lifetime estimate} = \frac{WE \times S(\text{byte})}{BW(\text{byte}/\text{sec})} \quad (1)$$

where S is the size of a region of memory, WE is the write endurance of the region of memory cell, and BW is the write bandwidth to the region. In addition to using the write traffic signature to estimate memory lifetime, the lifetime approximation engine 210 uses a local linear curve fitting technique to estimate memory lifetime to select different configurations of (e.g. engine-policy pairs) the wear leveling mechanism to meet system targets (e.g. memory, performance, energy, etc.). Such a local linear curve fitting technique determines a lifetime estimate based on linear curve fit for a particular configuration of a wear leveling mechanism using write traffic signature based estimates by the following equation:

$$LC_2 = \frac{S_2 - S_1}{S_3 - S_1} \times (LS_3 - LS_1) + LS_1 \quad (2)$$

where $LS_n$ is the lifetime estimate based on write signature for configuration n, $LC_n$ lifetime estimate based on linear curve fit for configuration n, and S is the static score found by using the following equation:

$$\text{Score} = \text{effi.} \times \text{freq.} \times \frac{\text{reg.}}{\text{gran.}} \quad (3)$$

where effi. is the wear leveling engine efficiency, freq is the wear leveling frequency, reg is wear leveling region and gran is the wear leveling granularity.

The overhead grading engine 215 estimates performance and energy overhead of a wear leveling mechanism (e.g. engine-pair) based on write traffic signature and features of wear leveling engines and wear leveling policies. Table 1 illustrates exemplary overhead effects (qualitatively) from switching between a table based wear leveling engine to a rotation based wear leveling engine as well as switching between different wear leveling policies based on frequency, region, granularity, as well as engine type.

TABLE 1

| | | \multicolumn{2}{c}{Table-Based} | \multicolumn{2}{c}{Rotation-Based} |
| --- | --- | --- | --- | --- | --- |
| | | Overhead | Comments | Overhead | Comments |
| Frequency | Fine to Coarse | NO | No Overhead | NO | No Overhead |
| | Coarse to Fine | | | | Apply changes until layout reset delayed when epoch ! = reset period (layout resets periodically based on total blocks of rotation) Or Extend address calculation latency, apply multiple address calculation for applied configure changes |
| Region | Small to Big | | | Small | |
| | Big to Small | | | | |
| Granularity | Fine to Coarse | Big | Shrink translation table Merge translation fine entries Might require data migration | | |
| | Coarse to Fine | Small | Extend translation table Split translation coarse entries to multiple fine entries | | |
| Engine | Table to Rotation | Big | Remove translation table Reset Data Layout | N/A | N/A |

TABLE 1-continued

| | Overhead Effects | | | |
|---|---|---|---|---|
| | Table-Based | | Rotation-Based | |
| | Overhead | Comments | Overhead | Comments |
| Rotation to Table | N/A | Data Migration Required | Small | Build translation table based on current layout (calculating by formula) |

For example, a current wear leveling mechanism implements a table-based wear leveling engine and wear leveling policy with granularity fine to coarse. Selecting a different wear leveling mechanism having a table-based wear leveling engine but with a wear leveling policy with granularity coarse to fine incurs a big overhead, according to Table 1.

The scoreboard engine 220 determines the effectiveness of the current configuration of the wear leveling mechanism based on the lifetime estimation calculated by the lifetime approximation engine 210 and the overhead (e.g. performance and energy) estimation calculated by the overhead grading engine 215. The effectiveness includes determining whether the current configuration meets lifetime, performance, and energy targets as well as prioritizing targets by user preference. For example, Table 2 below lists the effectiveness of certain configurations ("CFG") of a wear leveling mechanism and is called a Lifetime Estimation Matrix. In such an example, a memory lifetime target is 15 years. A current configuration 6 has an overhead estimate (3%) but estimated lifetime is well below target (1.4 years). Accordingly, the scoreboard engine 220 selects configuration 4 for the next wear leveling epoch or time period because it estimates lifetime above the target (20 years) although with a greater overhead (13%).

TABLE 2

| | Lifetime Estimation Matrix | | | | | | |
|---|---|---|---|---|---|---|---|
| | Wear Leveling Engine | | Wear Leveling Policies | | | Estimated | Estimated |
| CFG | Engine | Efficiency | Frequency | Granularity | Region | Lifetime | Overhead |
| 0 | Perfect | 1 | Infinite | 64 B | ALL | 280 | 78% |
| 1 | None | 0 | 0% | 64 B | N/A | 0.02 | 0% |
| 2 | Engine A | 0.5% | 3% | 1 KB | 16 GB | 141 | 57% |
| 3 | Engine A | 0.5% | 2% | 1 KB | 1 GB | 27 | 15% |
| 4 | Engine A | 0.5% | 1% | 1 KB | 128 MB | 20 | 13% |
| 5 | Engine A | 0.5% | 1% | 1 KB | 16 MB | 3.6 | 5% |
| 6 | Engine A | 0.5% | 1% | 1 KB | 1 MB | 1.4 | 3% |

Figure 2B:
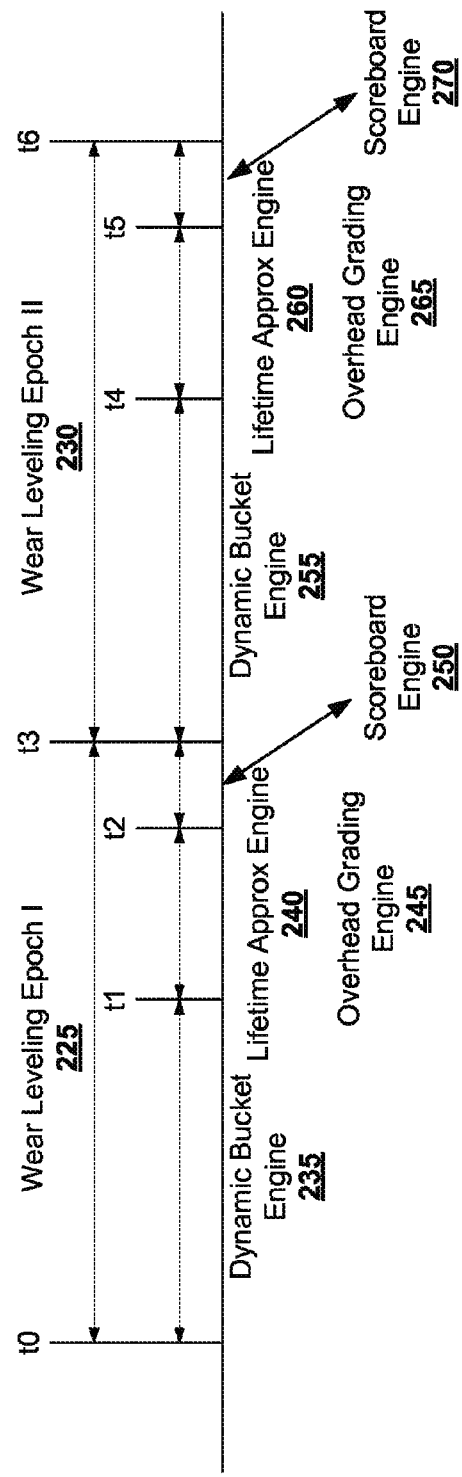
FIG. 2B illustrates an exemplary implementation of exemplary functions such as exemplary decision engine implemented in an adaptive wear leveling mechanism during one or more wear leveling epochs.

FIG. 2B illustrates an exemplary implementation 221 of exemplary functions such as exemplary decision engine implemented in an adaptive wear leveling mechanism during one or more wear leveling epochs. The adaptive wear leveling mechanism chooses different wear leveling mechanisms (engine-policy pairs) at the beginning of each epoch. Further, an exemplary chronological sequence of the exemplary function is shown including the selection of a different wear leveling mechanism (engine-policy pair). In FIG. 2B, two wear leveling epochs, Wear Leveling Epoch I 225 and Wear Leveling Epoch II 230, are shown. During Wear Leveling Epoch 225, a write traffic signature mechanism 235 is applied during a time t0 and time t1. Between a time t1 and time t2, a lifetime approximation engine 240 and an overhead grading engine 245 is implemented concurrently. The lifetime approximation engine estimates the memory lifetime based on the write traffic signature received. Further, the overhead grading engine estimates the switching overhead (performance overhead, energy overhead, etc.) for changing from a current configuration of the wear leveling mechanism (engine-policy pair) to a different configuration. Further, between time t2 and time t3 a scoreboard engine 250 is implemented. The scoreboard engine may determine to change the configuration of the wear leveling mechanism (engine-policy pair) based on the estimated memory lifetime determined by the lifetime approximation engine and estimated overhead determined by the overhead regarding engine as well as memory status data, adjusted target data, and user requirements. At a time t3, the decision engine selects a wear leveling engine and wear leveling policy for a wear leveling mechanism to be implemented in the next wear leveling epoch 230 to meet lifetime, performance, and energy targets. Similarly during Wear Leveling Epoch II 230, the write traffic signature mechanism 255 is implemented during a time t3 and time t4. Between a time t4 and time t5, a lifetime approximation engine 260 and an overhead engine 265 are implemented concurrently. Further, between time t5 and time t6 the scoreboard engine 250 is implemented. At a time t6, the decision engine selects a wear leveling engine and wear leveling policy for a wear leveling mechanism to be implemented in a next wear leveling epoch to meet lifetime, performance, and energy targets.

Figure 3:
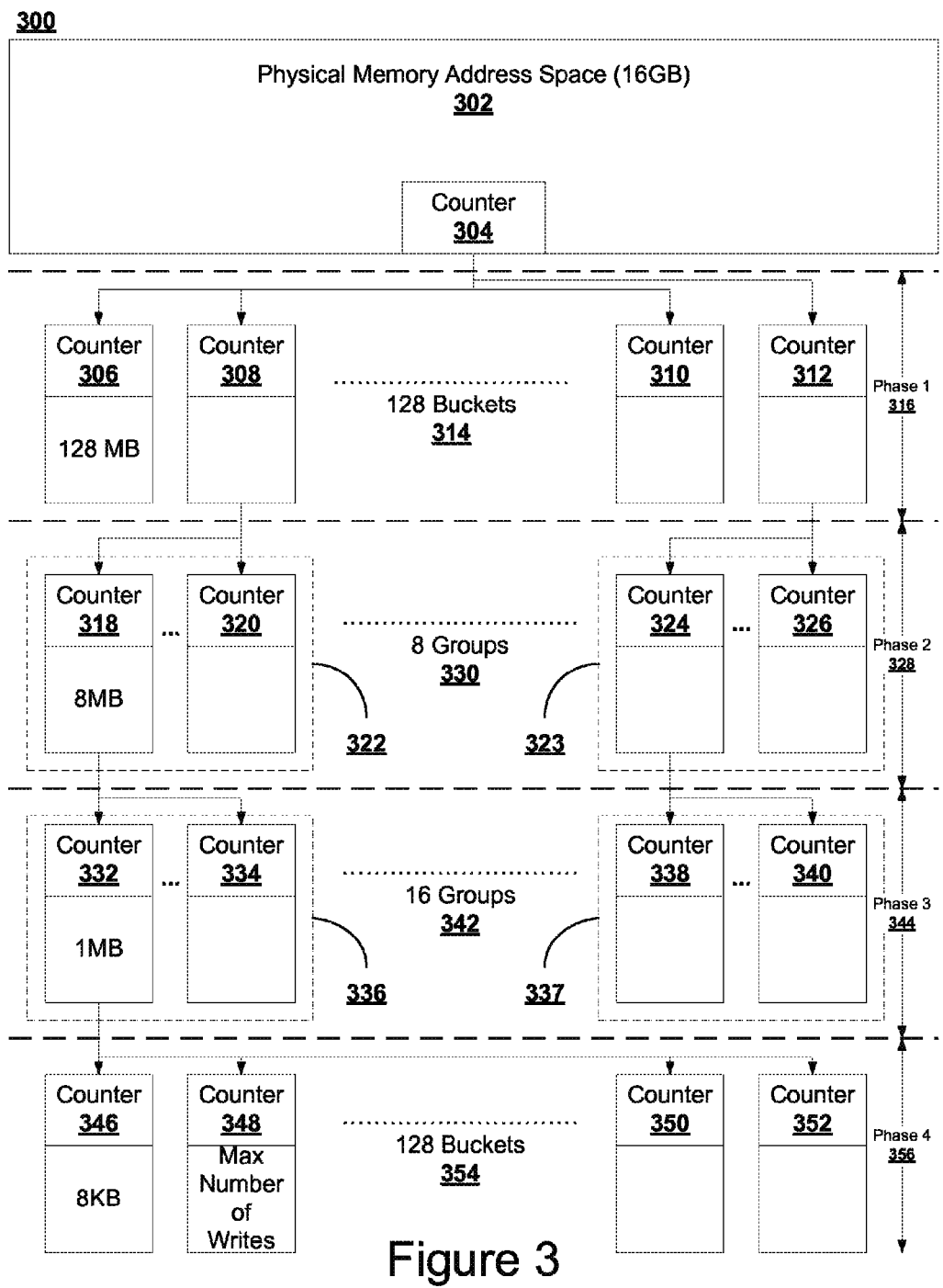
FIG. 3 shows an exemplary write traffic signature mechanism for a wear leveling system.

FIG. 3 shows an exemplary write traffic signature mechanism 300 for a wear leveling system. A write signature provides write information of a memory such as total writes, write requests ratio, maximum writes to region, and average writes to region. The write traffic signature mechanism 300 is a dynamic bucket engine and implemented on a physical memory address space (e.g. 16 GB) having a counter 304. The dynamic bucket engine provides a multi-phase, divide and conquer approach to generating a write traffic signature for a memory using a lesser number of counters than other straightforward write signature generating designs by reusing counters at each phase. For example, one straightforward design of a write traffic signature mechanism associates a counter to record the number of writes to each 8 KB block of a 16 GB memory requiring 2 million counters.

Alternatively, in the embodiment shown in FIG. 3, write traffic signature mechanism implemented by a dynamic bucket engine 300 has 128 32-bit counters (306-312, 318-326, 332-340, 346-352). In an example embodiment, the dynamic bucket engine 300 determines the maximum number of writes to a block of memory using the following method. In Phase 1 (316) of implementing the dynamic bucket engine (e.g. Phase 1 can be a portion of time between t0 to time t1 in FIG. 2B), each of the 128 counters (306-312) records the number of writes for a corresponding 128 MB portion of memory 302. The dynamic bucket engine then samples 8 counters recording a maximum number of writes to each corresponding 128 MB region and an address of each 128 MB region or portion of memory corresponding to one of the top 8 counters. The top (e.g. highest ranking) 8 counters (each corresponding to a 128 MB portion of memory) correspond to 1 GB of the 16 GB physical memory address space 302. In Phase 2 (328) of implementing the dynamic bucket engine, the counters are separated in 8 groups with each group having 16 counters (322 and 323) with each counter corresponding to a bucket and recording the number writes to a corresponding 8 MB portion (318-320) of the 1 GB of sampled memory from the previous phase (phase 1). After Phase 2 (328) is completed, the dynamic bucket engine then samples the top (e.g. highest ranking) 16 counters recording a maximum number of writes to each corresponding 8 MB region and an address of each 8 MB region or portion of memory corresponding to one of the top 16 counters. The 16 counters (each corresponding to an 8 MB portion of memory) correspond to 128 MB of the physical address memory space 302. In Phase 3 (344) of the dynamic engine implementation, the counters are separated into 16 groups, each group having 8 counters (336 and 337) and each counter (332-340) corresponding to a bucket and corresponding to a 1 MB portion of memory of the 128 MB of sampled memory from the previous phase (Phase 2). After Phase 3 (344) is completed, the dynamic bucket engine then samples the one counter (e.g. highest ranking) recording a maximum number of writes to a corresponding 1 MB region and an address of the region or portion of memory corresponding to the top counter. In this example embodiment, the one counter corresponds to a 1 MB portion of the physical address memory space 302. During phase 4 (356) of the dynamic engine implementation, each counter (346-352) corresponds to an 8 KB portion of memory of the 1 MB of sampled memory from the previous phase (Phase 3). After Phase 4 is completed, the 8 KB portion of memory corresponding to the counter recording the highest number of writes is determined 348. The write traffic signature is based on the 8 KB portion of memory with the maximum number of writes. Thus, the dynamic bucket engine provides the maximum number of writes recorded by the counter 348 as a write traffic signature to other aspects of a decision engine (lifetime approximation engine and overhead grading engine, See FIGS. 2A and 2B) as well as an address of the 8 KB memory portion corresponding to the counter 348.

Figure 4:
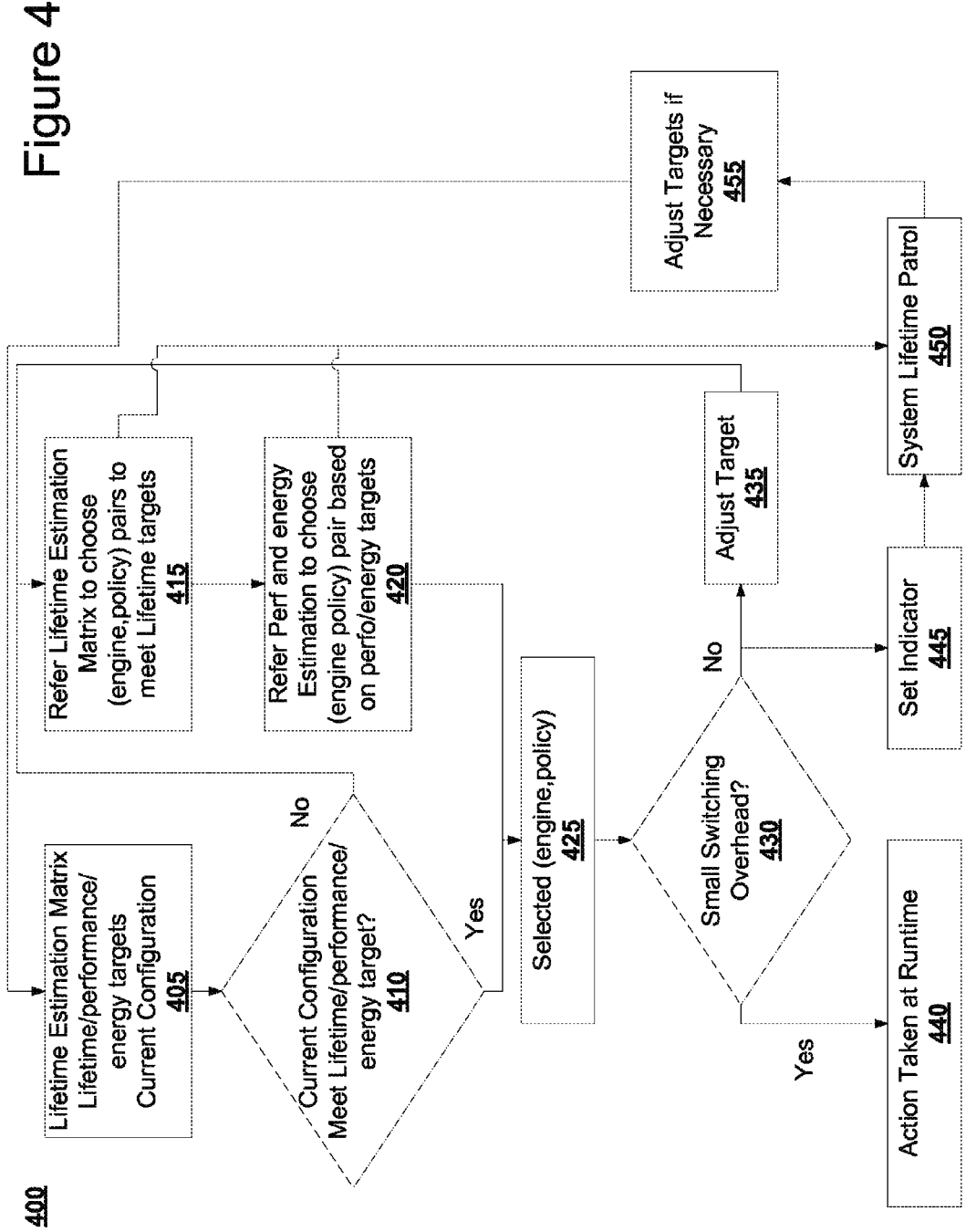
FIG. 4 is an exemplary flowchart of an exemplary method of wear leveling a memory.

FIG. 4 is an exemplary flowchart of an exemplary method 400 of wear leveling a memory. The example method 400 is implemented by a scoreboard engine in conjunction with a system lifetime patrol engine 450. At a step 405, a lifetime estimation matrix (generated by a scoreboard engine) such as shown in Table 2 above, but also includes lifetime, memory performance, and energy targets is referenced. Further, a current configuration of a wear leveling mechanism that includes a wear leveling engine-wear leveling policy pair has been selected based on information in the Lifetime Estimation Matrix as well as lifetime, memory performance, and energy targets. In a decisional step 410, the current configuration of the wear leveling mechanism is determined whether to meet the lifetime, memory performance, and energy targets. In this decisional step 410, if the lifetime, memory performance, and energy targets are met, then the current configuration of the wear leveling mechanism for the current epoch is selected again for the next wear leveling epoch at a step 425. However, if the lifetime, memory performance, and energy targets are not met in this decisional step 410, then reference is made to the lifetime estimation matrix to choose a wear leveling engine-wear leveling policy pair to meet the lifetime, memory performance, and energy targets at a step 415. At another step 420, reference is made to performance and energy estimation to choose an engine-policy pair based on performance and energy targets. Subsequently, such a wear leveling engine and wear leveling policy is selected at a step 425.

At a decisional step 430, it is determined whether a small switching overhead is incurred when selecting the wear leveling engine-wear leveling policy pair at a step 425. If a small switching overhead is determined then action of selecting the wear leveling engine-wear leveling policy at step 425 is taken at runtime. If a small switching overhead is not determined then an indicator is set at a step 445 and the lifetime, performance, and energy targets are adjusted at a step 435. In this example embodiment, the adjusted lifetime, performance, and energy targets are provided at step 415. Indicators that are set at step 445 include but are not limited to system status indicators, system logs, email, text messaging, multimedia messaging, instant messaging, and any other communication mechanism that can indicate status to a system administrator. Further, after setting the indicator at step 445, the indicator information is given to a system lifetime patrol engine 450 that monitors the system wear leveling status and the memory lifetime. In addition, the system lifetime patrol 450 adjusts the lifetime, performance, and energy targets, if necessary, and are provided at a step 405.

The system lifetime patrol 450 logs the wear leveling status including the memory lifetime estimate at each wear leveling epoch. In an example embodiment, such a system lifetime patrol 450 is implemented by a memory controller or an operating system. Further, the system lifetime patrol 450 estimates the memory lifetime in several different ways that include using a historical status table (See Table 3 below) indexed by lifetime estimate of each epoch and recording respective counts of the elapsed epochs. In an example embodiment, 1000 entries in a historical status table correspond to 0.05 years. A lifetime estimate for a system patrol engine 450 is calculated with a historical status table using the following equation:

$$\text{lifetime} = \frac{\sum_i \text{lifetime}_i \times \text{counts}_i}{\sum_i \text{counts}_i} \qquad (4)$$

where lifetime is the lifetime estimate using the historical status table, $\text{lifetime}_i$ is the programmed lifetime label, and $\text{counts}_i$=the number of epoch counts which has lifetime estimate of lifetime, recorded for epoch i. Alternatively, a recent status table listing the lifetime estimates of the 1000 most recent wear leveling epochs (See Table 4 below) is used to estimate the recent achieved lifetime of the last 1000 epochs. The recent status table is implemented with a circular FIFO having 1000 entries. A lifetime estimate recent achieved lifetime of last 1000 epochs for a system patrol engine 450 is calculated with a recent status table using the following equation:

$$\text{lifetime} = \frac{\sum_i \text{lifetime}_i}{\text{entries}} \qquad (5)$$

where lifetime is the lifetime estimate using the recent status table, lifetime$_i$=lifetime estimate of epoch i, and entries=the number of entries in the recent status table. In the example shown in Table 4, the number of entries is 1000.

TABLE 3

Historical Status Table

| Entry | Lifetime | Counts |
|---|---|---|
| 1 | 50 | 100 |
| 2 | 49.95 | 4 |
| 3 | 49.90 | 1 |
| 4 | 49.85 | 0 |
| ... | ... | ... |
| ... | ... | ... |
| 998 | 0.10 | 20 |
| 999 | 0.05 | 5 |
| 1000 | 0 | 0 |

TABLE 4

Recent Status Table

| Entry | Lifetime |
|---|---|
| 1 | 21 |
| 2 | 2.50 |
| 3 | 3.05 |
| 4 | 12.50 |
| ... | |
| ... | |
| 998 | 7.05 |
| 999 | 35.05 |
| 1000 | 0 |

Figure 5A:
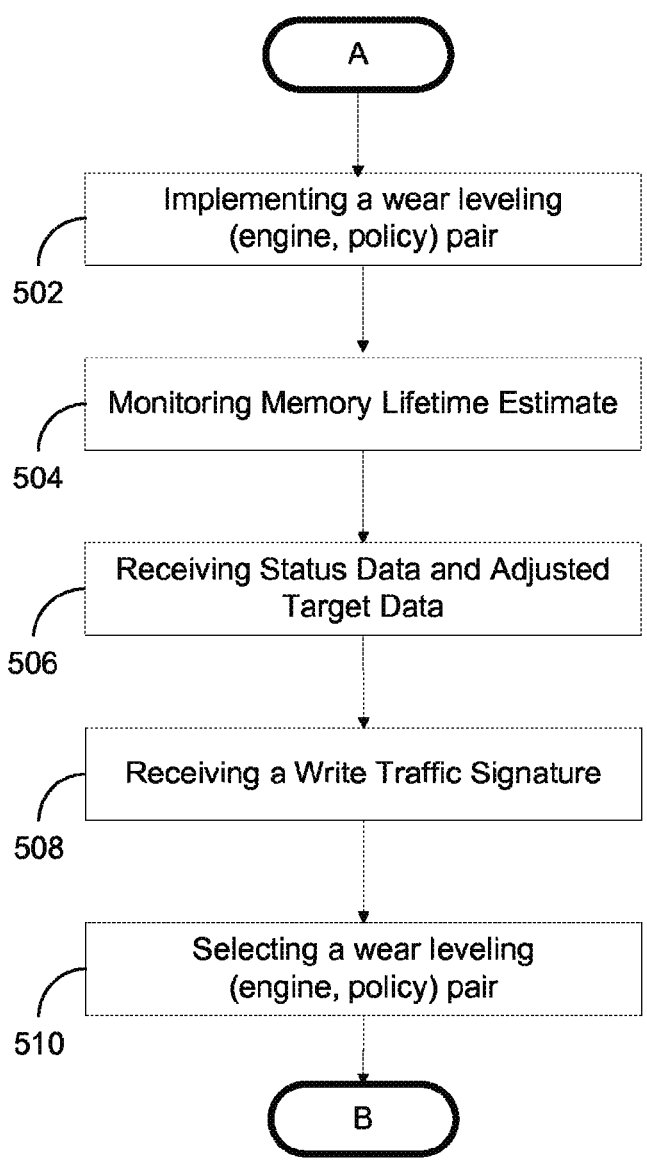
FIGS. 5A and 5B are an exemplary flowchart of an exemplary method of wear leveling a memory.
Figure 5B:
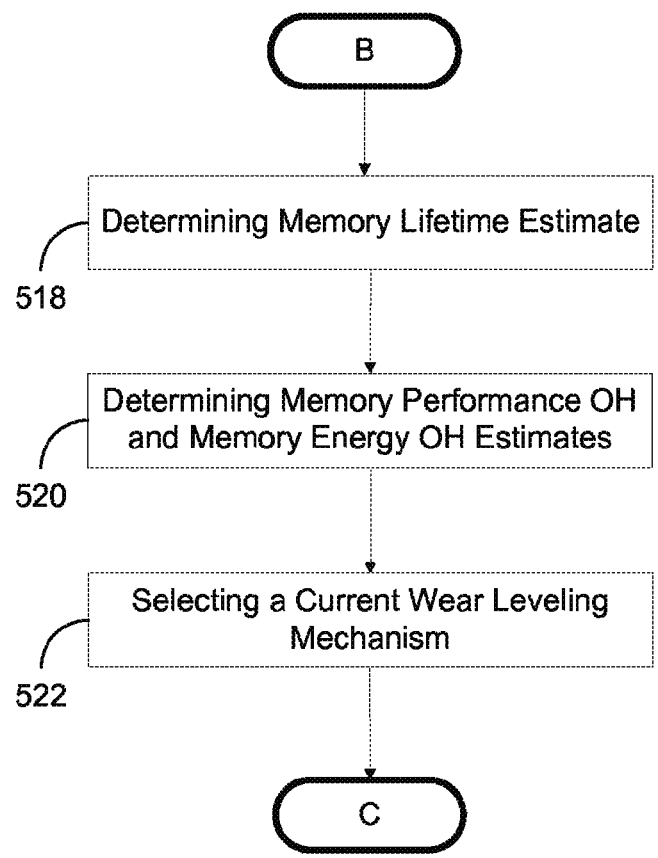

FIGS. 5A and 5B are exemplary flowcharts of an exemplary method of wear leveling a memory. Referring to FIG. 5A, a step in the exemplary method includes implementing one or more wear leveling engines and one or more wear leveling policies in a wear leveling mechanism for a memory at a current wear leveling epoch, as shown in block 502. A further step includes monitoring a memory lifetime estimate for the memory using a system lifetime patrol engine, as shown in block 504. Another step in the exemplary method includes receiving status data from the memory provided by the decision engine, as shown in block 506. An additional step includes receiving a write traffic signature of the memory during the current wear leveling epoch from a write traffic signature mechanism (e.g. dynamic bucket engine) by a decision engine, as shown in block 508. In an example embodiment, status data includes dynamic status and static status data of the memory. Non-limiting examples of adjusted target data is adjusted lifetime, performance, and energy target determined by the lifetime patrol engine. Another step is selecting a wear leveling engine and wear leveling policy at the next wear leveling epoch using the decision engine based upon the write traffic signature, status data, and adjusted target data, as shown in block 510.

Referring to FIG. 5B and exemplary flow chart 501, in an embodiment, an additional step in the example method includes determining a memory lifetime estimate based on the write traffic signature generated by the write traffic signature mechanism by the lifetime approximation engine, as shown in block 518. The memory lifetime estimate is calculated based on the write traffic signature or by using a local curve fitting technique as described in the present disclosure. Another step includes determining a performance overhead estimate and an energy overhead estimate for each of the one or more wear leveling mechanisms using the overhead grading engine based on the write traffic signature of the memory received from the write traffic signature mechanism, as shown in block 520. A further step includes selecting a current wear leveling engine-policy pair (e.g. wear leveling mechanism) from the one or more wear leveling engines and wear leveling policies for a current time period by a scoreboard engine based on the memory lifetime estimate received from the lifetime approximation engine and based on the performance overhead estimate and the energy overhead estimate for each of the one or more wear leveling mechanisms received from the overhead grading engine, as shown in block 522.

In an example embodiment, the write traffic signature mechanism is a dynamic bucket engine using one or more counters during one or more phases to determine the write traffic signature of the memory. Also, the one or more wear leveling engines can be table-based wear leveling engine, rotation-based wear leveling engine, heterogeneous wear leveling engine, multi-level wear leveling engine, etc. The one or more wear leveling policies can be based on wear leveling frequency, wear leveling granularity, and wear leveling region, etc. Further, the memory lifetime estimate can be determined using a write traffic signature, a write endurance of memory cell, a wear leveling region size, and a write bandwidth of a wear leveling region of the memory. In an embodiment, the status data received from the memory can be static status data such as memory cell write endurance, memory capacity, memory organization as well as dynamic status data such as application behavior, write bandwidth, write footprint, write requests ratio, and write distribution, etc. Also, the adjusted memory lifetime target can be determined using the lifetime patrol engine based on a historical status table and a recent status table as described in the present disclosure. Further, the target data received from the lifetime patrol engine can be an adjusted memory lifetime target, an adjusted performance target, and an adjusted energy target. In addition, the user requirements received from a user interface can include a user-defined memory lifetime target, a user-defined performance target, and a user-defined energy target.

Figure 6A:
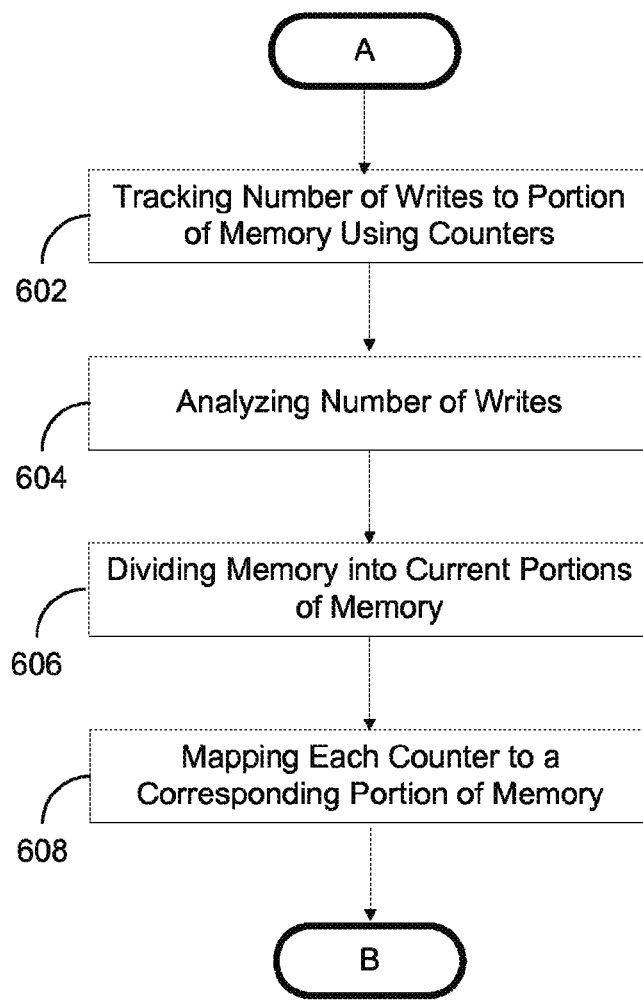
FIGS. 6A-6C are exemplary flowcharts of an exemplary method of a write traffic signature mechanism for an exemplary wear leveling system.
Figure 6B:
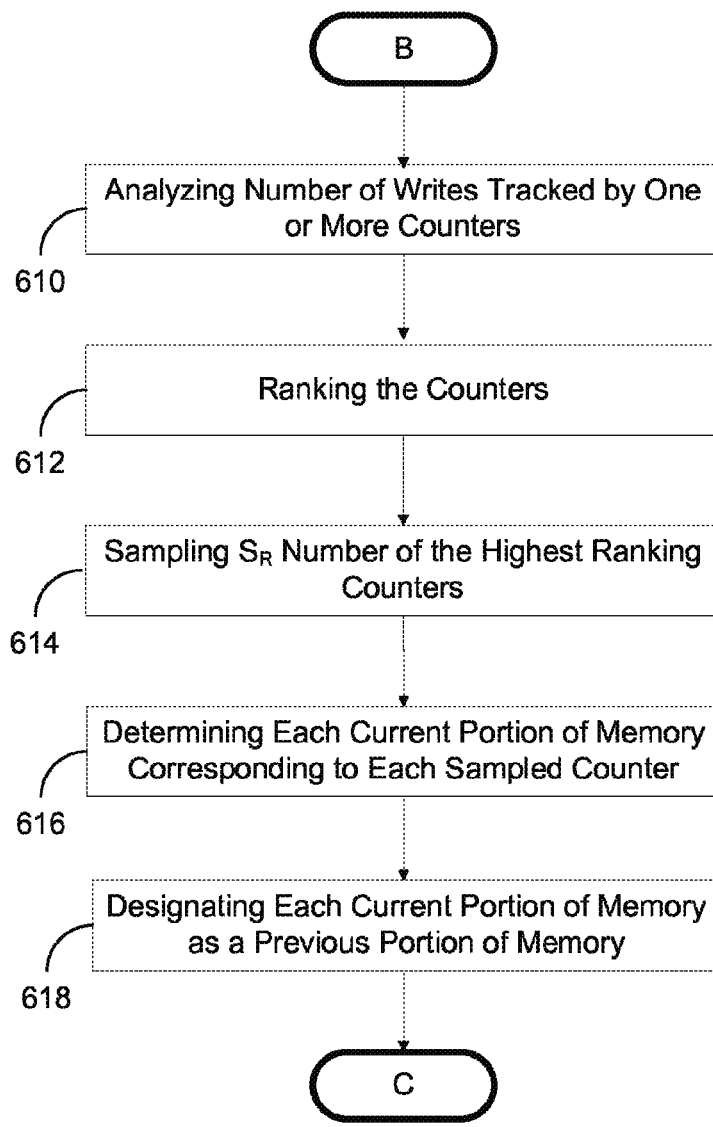
Figure 6C:
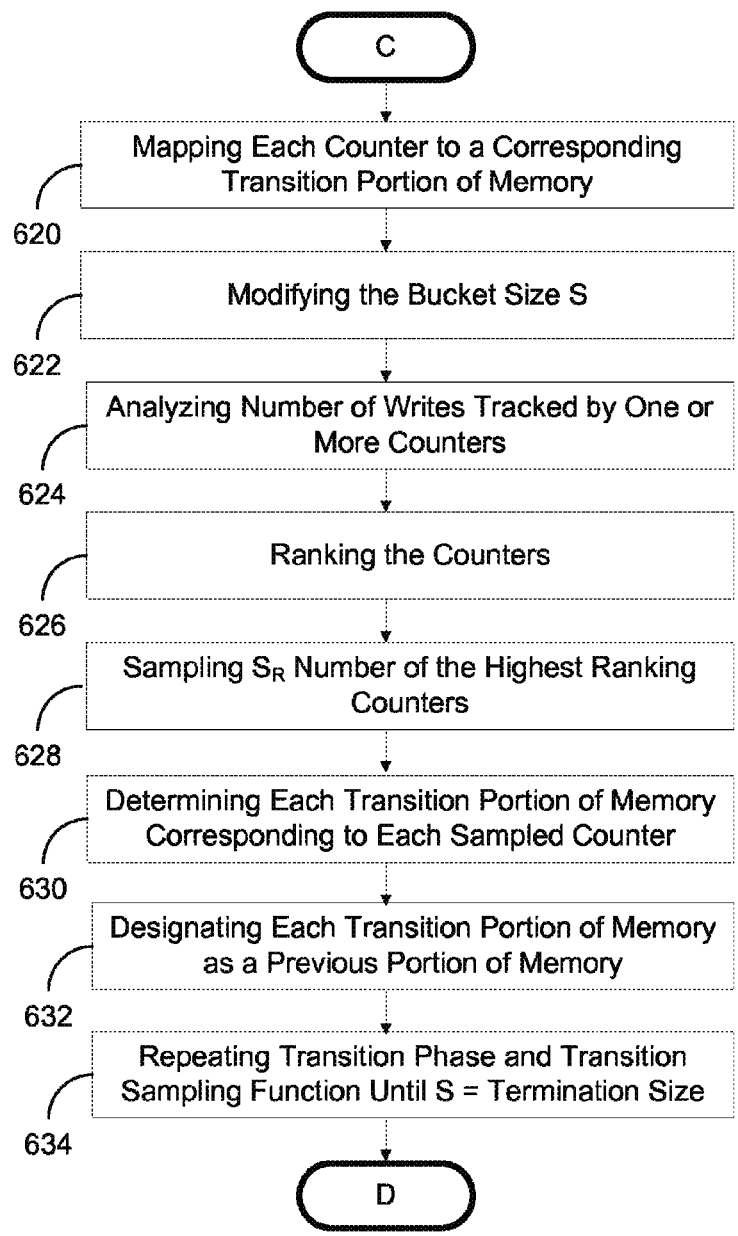

FIGS. 6A-6C are exemplary flowcharts of an exemplary method of a write traffic signature mechanism for an exemplary wear leveling system. Referring to FIG. 6A, exemplary flowchart 600 shows steps of an exemplary method implemented by dynamic bucket engine. A first step in the example method includes tracking the number of writes to a portion of the memory using the one or more counters, as shown in block 602. A further step includes analyzing the number of writes tracked by each of the one or more counters using the dynamic bucket engine, as shown in block 604. The dynamic bucket engine is coupled to the one or more counters and determines a block of the memory with a maximum number of writes to a portion of memory over one or more phases of implementing the dynamic bucket engine using one or more sampling functions. An additional step includes dividing the memory into one or more current portions of memory during a current phase of implementing the dynamic bucket engine, as shown in block 606. Another step includes mapping each of the one or more counters to a corresponding current portion of memory during a current phase of implementing the dynamic bucket engine such that the each counter tracks the number of writes to the corresponding current portion of memory, as shown in block 608.

Referring to FIG. 6B and exemplary flowchart 601, the dynamic bucket engine performs a first sampling function with a bucket size S and sample size $S_R$ during the phase. The value of either bucket size S or sample size $S_R$ may or may not change from one phase to another. A further step in the exemplary method is implemented by a sampling function analyzing the number of writes tracked by each of the one or more counters, as shown block 610. An additional step includes ranking the one or more counters by the number of writes by the sampling function, as shown in block 612. Another step includes sampling the $S_R$ number of highest ranking counters of the one or more counters by recording the number of writes and the address of the portion of memory corresponding to each of the $S_R$ number of highest ranking counters, as shown in block 614. A further step in the exemplary method includes determining each current portion of memory corresponding to each sampled counter, as shown in block 616. An additional step includes designating each current portion of memory as a previous portion of memory either at the beginning of each phase, or alternatively, at the end of each phase, as shown in block 618.

Referring to FIG. 6C and exemplary flowchart 603, the exemplary method includes a transition phase during which the dynamic bucket engine maps each of the one or more counters to a corresponding transition portion of memory such that each counter tracks the number of writes to the corresponding transition portion of memory wherein the transition portion of memory is a subset of one of the previous portions of memory, as shown in block 620. A further step includes modifying the bucket size S based on the size of each transition portion of memory, as shown in block 622. An additional step includes the dynamic bucket engine performing a transition sampling function with a sample size $S_R$ analyzing the number of writes tracked by each of the one or more counters, as shown in block 624. Another step includes ranking the one or more counters by the number of writes, as shown in block 626. A further step in the exemplary method includes sampling the $S_R$ number of highest ranking counters of the one or more counters by recording the number of writes and the address of the portion of memory corresponding to each of the $S_R$ number of highest ranking counters, as shown in block 628. An additional step includes determining each transition portion of memory corresponding to each sampled counter, as shown in block 630. Another step includes designating each transition portion of memory as a previous portion of memory either at the beginning of each phase, or alternatively, at the end of each phase, as shown in block 632. A further step in the exemplary method includes repeating the transition phase and transition sampling function by the dynamic bucket engine until the dynamic bucket engine modifies the bucket size S to a termination block size and determines the address of block of the memory with the maximum number of writes, as shown in block 634.

In the preceding detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the following description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

Persons of ordinary skill in the art would understand that the examples described in the present disclosure are illustrative and not limiting and that the concepts illustrated in the examples may be applied to other examples and embodiments.

Note that the functional blocks, methods, devices and systems described in the present disclosure may be integrated or divided into different combination of systems, devices, and functional blocks as would be known to those skilled in the art.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system for performing wear leveling, the system comprising:
   a memory;
   one or more wear leveling engines;
   one or more wear leveling policies;
   a decision engine having a write traffic signature mechanism; and
   wherein the decision engine selects a wear leveling mechanism based upon:
      receiving a write traffic signature of the memory from the write traffic signature mechanism wherein the write traffic signature comprises data that is a function of a number of writes to the memory,
      receiving status data from the memory;
   wherein the wear leveling mechanism includes a wear leveling engine selected from the one or more wear leveling engines and a wear leveling policy selected from the one or more wear leveling policies.

2. The system according to claim 1, further comprising a lifetime patrol engine coupled to the memory and the decision engine, the lifetime patrol engine providing an adjusted memory lifetime target to the decision engine.

3. The system according to claim 2, wherein the adjusted target data received from the lifetime patrol engine is selected from the group consisting of an adjusted memory lifetime target, an adjusted performance target, and an adjusted energy target.

4. The system according to claim 2, wherein the lifetime patrol engine determines the adjusted memory lifetime target based on a status table, the status table can be selected from the group consisting of a historical status table and a recent status table.

5. The system according to claim 2, wherein the lifetime patrol engine determines the adjusted memory lifetime target using a first lifetime counter that tracks the number of time periods, a second counter that tracks a current lifetime for a time period, and third counter that tracks a total lifetime based on a number of time periods and the current lifetime.

6. The system according to claim 2, wherein the lifetime patrol engine provides feedback data to the decision engine using a feedback mechanism, the feedback data based on the adjusted memory lifetime target.

7. The system according to claim 6, wherein the feedback mechanism is selected from the group consisting of system logs, email, text messaging, multimedia messaging, instant messaging, and a communication mechanism.

8. The system according to claim 1, wherein the system performs wear leveling over one or more time periods.

9. The system according to claim 1, further comprising a lifetime approximation engine coupled to the decision engine and the write traffic signature mechanism, wherein the lifetime approximation engine determines a memory lifetime estimate based on the write traffic signature generated by the write traffic signature mechanism.

10. The system according to claim 9, wherein the lifetime approximation engine determines the memory lifetime estimate based on the write bandwidth of a wear leveling region generated by the write traffic signature mechanism, a memory cell write endurance, and a wear leveling region size.

11. The system according to claim 9, wherein the lifetime approximation engine determines the memory lifetime estimate based on a local linear curve fitting mechanism.

12. The system according to claim 1, further comprising an overhead grading engine coupled to the decision engine and the write traffic signature mechanism, wherein the overhead grading engine determines a performance overhead estimate and an energy overhead estimate for each of one or more wear leveling mechanisms based on the write traffic signature received from the write traffic signature mechanism.

13. The system according to claim 12, further comprising
a lifetime approximation engine coupled to the decision engine and the write traffic signature mechanism, wherein the lifetime approximation engine determines a memory lifetime estimate based on the write traffic signature generated by the write traffic signature mechanism and
a scoreboard engine coupled to the lifetime approximation engine and the overhead grading engine, wherein the scoreboard engine selects a current wear leveling mechanism from the one or more wear leveling mechanisms for a current time period based on the memory lifetime estimate received from the lifetime approximation engine and based on the performance overhead estimate and the energy overhead estimate for each of the one or more wear leveling mechanisms received from the overhead grading engine.

14. The system according to claim 1, wherein the write traffic signature mechanism is a dynamic bucket engine using one or more counters during one or more phases to determine the write traffic signature of the memory.

15. The system according to claim 14, the system further comprising:
the one or more counters tracking the number of writes to a portion of the memory; and
the dynamic bucket engine coupled to the one or more counters, the dynamic bucket engine determines a block of the memory with a maximum number of writes to a portion of memory over one or more phases of implementing the dynamic bucket engine using one or more sampling functions.

16. The system according to claim 13, wherein the dynamic bucket engine during an initial phase divides the memory into one or more current portions of memory and maps each of the one or more counters to a corresponding current portion of memory of bucket size S such that the each counter tracks the number of writes to the corresponding current portion of memory.

17. The system according to claim 16, wherein the dynamic bucket engine during a second phase performs a first sampling function with a sample size $S_R$ during the second phase, the first sampling function includes the dynamic bucket engine:
analyzing the number of writes tracked by each of the one or more counters;
ranking the one or more counters by the number of writes;
sampling the $S_R$ number of highest ranking counters of the one or more counters by recording the number of writes and the address of the portion of memory corresponding each of the $S_R$ number of highest ranking counters;
determining each current portion of memory corresponding to each sampled counter; and
designating each current portion of memory as a previous portion of memory.

18. The system according to claim 17, wherein during a transition phase of implementing the dynamic bucket engine, the dynamic bucket engine:
maps each of the one or more counters to a corresponding transition portion of memory such that each counter tracks the number of writes to the corresponding transition portion of memory wherein each transition portion of memory is a subset of one of the previous portions of memory; and
modifies the bucket size S based on the size of each transition portion of memory.

19. The system according to claim 18, wherein the dynamic bucket engine performs a transition sampling function with the sample size $S_R$, the transition sampling function includes the dynamic bucket engine:
analyzing the number of writes tracked by each of the one or more counters;
ranking the one or more counters by the number of writes;
sampling the $S_R$ number of highest ranking counters of the one or more counters by recording the number of writes and the address of the transition portion of memory corresponding each of the $S_R$ number of highest ranking counters;
determining each transition portion of memory corresponding to each sampled counter; and
designating each transition portion of memory as a previous portion of memory.

20. The system according to claim 19, wherein the dynamic bucket engine repeats the transition phase and the transition sampling function until the dynamic bucket engine modifies the bucket size S to a value equal to a termination block size and determines the address of a block of the memory with a maximum number of writes.

21. The system according to claim 1, wherein the one or more wear leveling engines are selected from the group consisting of table based wear leveling engine, rotation based wear leveling engine, heterogeneous wear leveling engine, and multi-level wear leveling engine.

22. The system according to claim 1, wherein the one or more wear leveling policies are selected from the group consisting of wear leveling frequency, wear leveling granularity, and wear leveling region.

23. The system according to claim 1, wherein the status data received from the memory is selected from a group consisting of memory endurance, memory capacity, memory organization, write bandwidth, write footprint, write requests ratio, and write distribution.

24. The system according to claim 1, wherein
the decision engine selects the wear leveling mechanism further based upon user requirement data;
the user requirement data consisting of at least one of a memory system lifetime target, a performance target, and an energy target.

25. A method for performing wear leveling on a memory, the method comprising:
implementing one or more wear leveling mechanism wherein the wear leveling mechanism includes a wear leveling engine from one or more wear leveling engines and a wear leveling policy from one or more wear leveling policies;

receiving a write traffic signature of the memory from a write traffic signature mechanism by a decision engine wherein the write traffic signature comprises data that is a function of the number of writes to the memory;

receiving status data from the memory provided by the decision engine; and selecting the wear leveling mechanism using the decision engine based upon the write traffic signature, status data, and adjusted target data.

26. The method according to claim 25, further comprising monitoring a memory lifetime estimate for the memory using a lifetime patrol engine and receiving adjusted target data from the lifetime patrol engine by the decision engine.

27. The method according to claim 26, further comprising performing wear leveling over one or more time periods.

28. The method according to claim 26, further comprising determining the adjusted memory lifetime target using the lifetime patrol engine based on a status table, the status table can be selected from the group consisting of a historical status table and a recent status table.

29. The method according to claim 26, wherein the adjusted target data received from the lifetime patrol engine is selected from the group consisting of an adjusted memory lifetime target, an adjusted performance target, and an adjusted energy target.

30. The method according to claim 26, wherein a user requirements is selected from a group consisting of a memory lifetime target, a performance target, an energy target, and system requirements, and the selected user requirement is used as one criterion by the decision engine to select the wear leveling mechanism.

31. The method according to claim 25, further comprising determining a memory lifetime estimate based on the write traffic signature generated by the write traffic signature mechanism.

32. The method according to claim 31, further comprising determining a memory performance overhead estimate and a memory energy overhead estimate for each of the one or more wear leveling mechanisms using an overhead grading engine.

33. The method according to claim 32, further comprising determining a memory lifetime estimate based on the write traffic signature and selecting a current wear leveling mechanism from the one or more wear leveling mechanisms for a current time period by a scoreboard engine based on the memory lifetime estimate and based on the memory performance overhead estimate and the memory energy overhead estimate for each of the one or more wear leveling mechanisms received from the overhead grading engine.

34. The method according to claim 31, further comprising determining the memory lifetime estimate using the write traffic signature of the memory generated based on the write bandwidth of a wear leveling region generated by the write traffic signature mechanism, a memory cell write endurance, and a wear leveling region size.

35. The method according to claim 31, further comprising determining the memory lifetime estimate using a local linear curve fitting mechanism.

36. The method according to claim 25, wherein the write traffic signature mechanism is a dynamic bucket engine using one or more counters during one or more phases to determine the write traffic signature of the memory.

37. The method according to claim 36, further comprising:
tracking the number of writes to a portion of the memory using the one or more counters; and analyzing the number of writes tracked by each of the one or more counters using the dynamic bucket engine wherein the dynamic bucket engine is coupled to the one or more counters and determines a block of the memory with a maximum number of writes to a portion of memory over one or phases of implementing the dynamic bucket engine using one or more sampling functions.

38. The method according to claim 37, wherein the dynamic bucket engine during an initial phase is:
dividing the memory into one or more current portions of memory during a current phase of implementing the dynamic bucket engine; and
mapping each of the one or more counters to a corresponding current portion of memory of bucket size S during a current phase of implementing the dynamic bucket engine such that the each counter tracks the number of writes to the corresponding current portion of memory.

39. The method according to claim 38, wherein the dynamic bucket engine performs a first sampling function with a sample size $S_R$ during the phase, the first sampling function includes the dynamic bucket engine:
analyzing the number of writes tracked by each of the one or more counters;
ranking the one or more counters by the number of writes;
sampling the $S_R$ number of highest ranking counters of the one or more counters by recording the number of writes and the address of the portion of memory corresponding each of the $S_R$ number of highest ranking counters;
determining each current portion of memory corresponding to each of sampled counter; and
designating each current portion of memory as a previous portion of memory.

40. The method according to claim 39, wherein during a transition phase of implementing the dynamic bucket engine, the dynamic bucket engine is:
mapping each of the one or more counters to a corresponding transition portion of memory such that each counter tracks the number of writes to the corresponding transition portion of memory wherein the transition portion of memory is a subset of one of the previous portions of memory; and
modifying the bucket size S based on the size of each transition portion of memory.

41. The method according to claim 40, wherein the dynamic bucket engine performs a transition sampling function with a sample size $S_R$, the transition sampling function includes the dynamic bucket engine:
analyzing the number of writes tracked by each of the one or more counters;
ranking the one or more counters by the number of writes;
sampling the $S_R$ number of highest ranking counters of the one or more counters by recording the number of writes and the address of the portion of memory corresponding each of the $S_R$ number of highest ranking counters;
determining each transition portion of memory corresponding to each of sampled counter; and
designating each transition portion of memory as a previous portion of memory.

42. The method according to claim 41, further comprising repeating the transition phase and transition sampling function by the dynamic bucket engine until the dynamic bucket engine modifies the bucket size S to a termination block size and determines the address of block of the memory with the maximum number of writes.

43. The method according to claim 25, wherein the one or more wear leveling engines can be selected from the group consisting of table based wear leveling engine, rotation based wear leveling engine, heterogeneous wear leveling, and multi-level wear leveling engine.

44. The method according to claim 25, wherein the one or more wear leveling policies can selected from the group consisting of wear leveling frequency, wear leveling granularity, and wear leveling region.

45. The method according to claim 25, wherein the status data received from the memory can be selected from a group consisting of, memory endurance, memory capacity, memory organization, write bandwidth, write footprint, write requests ratio, and write distribution.

* * * * *